(12) United States Patent
Titokis et al.

(10) Patent No.: US 7,749,005 B2
(45) Date of Patent: Jul. 6, 2010

(54) HIGH-POWER BREAKER SWITCH WITH A WHEEL GEAR AND A WHEEL RACK

(75) Inventors: Konstantinos Titokis, Luedenscheid (DE); Volker Thurau, Dortmund (DE)

(73) Assignee: Kostal Kontakt Systeme GmbH, Ludenscheid (DE)

( * ) Notice: Subject to any disclaimer, the term of this patent is extended or adjusted under 35 U.S.C. 154(b) by 0 days.

(21) Appl. No.: 12/620,961

(22) Filed: Nov. 18, 2009

(65) Prior Publication Data

US 2010/0081304 A1    Apr. 1, 2010

Related U.S. Application Data

(63) Continuation of application No. PCT/EP2008/056125, filed on May 19, 2008.

(30) Foreign Application Priority Data

May 18, 2007 (DE) ................... 10 2007 023 273

(51) Int. Cl.
*H01R 13/62* (2006.01)
(52) U.S. Cl. ....................................... 439/157
(58) Field of Classification Search ................ 439/157, 439/372, 152, 159, 160, 259, 266
See application file for complete search history.

(56) References Cited

U.S. PATENT DOCUMENTS

| | | | | |
|---|---|---|---|---|
| 5,322,448 | A * | 6/1994 | Hahn | 439/157 |
| 5,833,484 | A * | 11/1998 | Post et al. | 439/352 |
| 6,325,647 | B1 | 12/2001 | May et al. | |
| 6,736,655 | B2 | 5/2004 | Martin et al. | |
| 6,982,393 | B2 * | 1/2006 | Matsui et al. | 200/335 |
| 6,997,725 | B2 * | 2/2006 | Stella et al. | 439/157 |
| 7,238,050 | B2 | 7/2007 | Sakakura et al. | |
| 2002/0173185 | A1 | 11/2002 | Fukushima et al. | |
| 2003/0199184 | A1 | 10/2003 | Martin et al. | |
| 2005/0098419 | A1 | 5/2005 | Matsui et al. | |
| 2005/0215122 | A1 | 9/2005 | Nishida | |
| 2006/0172602 | A1 | 8/2006 | Sakakura et al. | |
| 2009/0246992 | A1 * | 10/2009 | Martin | 439/157 |

FOREIGN PATENT DOCUMENTS

| | | |
|---|---|---|
| EP | 1077512 A2 | 2/2001 |
| EP | 1355385 A2 | 10/2003 |
| EP | 1689046 A1 | 8/2006 |
| EP | 1755200 A2 | 2/2007 |

* cited by examiner

*Primary Examiner*—Chandrika Prasad
(74) *Attorney, Agent, or Firm*—Brooks Kushman P.C.

(57) ABSTRACT

Breaker switch includes connector, socket, and surrounding housings. The connector housing has contacts and a blocking lever. The socket housing has sockets and a gear rack. An operating lever has a gear mounted to the connector housing and engaged to the gear rack to mount the connector and socket housings such that the connector housing is movable relative to the socket housing between starting and final positions. In the starting position the connector and socket housings disengage such that the contacts and sockets disengage. In the final position the connector and socket housings engage such that the contacts and sockets engage. In the starting and final positions the blocking lever engages the gear to maintain the position of the connector housing. The surrounding housing is connected to the socket housing and has a control edge that releases the blocking lever from the gear to enable the connector housing to move.

10 Claims, 4 Drawing Sheets

HIGH-POWER BREAKER SWITCH WITH A WHEEL GEAR AND A WHEEL RACK

CROSS-REFERENCE TO RELATED APPLICATIONS

This application is a continuation of International Application PCT/EP2008/056125, published in German, with an international filing date of May 19, 2008, which claims priority to DE 10 2007 023 273.1, filed May 18, 2007; the disclosures of which are both hereby incorporated by reference.

BACKGROUND OF THE INVENTION

1. Field of the Invention

The present invention relates to a high-power breaker switch for a vehicle in which the breaker switch includes a connector housing having plug-in contact elements, a socket housing having socket contacts, and an operating lever which enables the plug-in contacts to be connected to and disconnected from the socket contacts.

2. Background Art

DE 10 2004 054 360 (corresponding to U.S. Pat. No. 6,982,393) describes a high-power breaker switch.

SUMMARY OF THE INVENTION

A high-power breaker switch in accordance with embodiments of the present invention is for use with electric vehicles and hybrid vehicles having an electrical drive in addition to an internal combustion engine. The breaker switch is to be used to disconnect the electrical supply of a vehicle for maintenance which is required now and then. The breaker switch is safe to the touch as the electrical supply provides relatively high currents and voltages. The breaker switch is also designed to emit no more than relatively small amounts of electromagnetic noise.

An object of the present invention is a high-power breaker switch having a non-exposed electrical design that prevents undesirable human contact, high electro-magnetic stability, and a design which prevents incorrect connection of the switching components insofar as possible.

In carrying out the above object and other objects, the present invention provides a high-power breaker switch having a connector housing, a socket housing, a surrounding housing, and an operating lever. The connector housing has plug-in contact elements and a blocking lever. The socket housing has socket contacts and a gear wheel rack. The operating lever has a gear wheel pivotably mounted to the connector housing and engaged to the gear wheel rack of the socket housing to thereby pivotably mount the connector housing to the socket housing such that the connector housing is movable with the operating lever relative to the socket housing between a starting position and a final position. The gear wheel rotates within the gear rack along a plane of rotation as the connector housing along with the operating lever move between the starting and final positions. In the starting position the connector housing is disengaged from the socket housing such that the plug-in contact elements are disengaged from the socket contacts. In the final position the connector housing is engaged with the socket housing such that the plug-in contact elements are engaged and electrically connected with the socket contacts.

In the starting position the blocking lever engages a first gap of the gear wheel of the operating lever to maintain the connector housing along with the operating lever in the starting position.

In the final position the blocking lever engages a second gap of the gear wheel of the operating lever to maintain the connector housing along with the operating lever in the final position.

The surrounding housing may be made of metal or may be metallic. The surrounding housing is connected to the socket housing between the connector housing and the socket housing.

The surrounding housing has a control edge that releases the blocking lever from the gear wheel to enable the connector housing along with the operating lever to be movable between the starting and final positions.

In embodiments of the present invention, a high-power breaker switch includes a connector housing having plug-in contact elements, a socket housing having socket contacts, and an operating lever pivotably mounted to the connector housing. The surrounding housing is made of metal or is metallized. The surrounding housing is combined with the socket housing. At least one inner surface of the surrounding housing has a molded control edge that removes a mechanical blocking element of the operating lever located on the connector housing when the connector housing is being joined to the socket housing.

The above features, and other features and advantages of the present invention are readily apparent from the following detailed descriptions thereof when taken in connection with the accompanying drawings.

DETAILED DESCRIPTION OF THE PREFERRED EMBODIMENT(S)

A high-power breaker switch in accordance with embodiments of the present invention performs safety functions in connection with service work on a vehicle and makes it possible to disconnect a battery potential. The breaker switch may be used with electric vehicles and hybrid vehicles in which high currents, and often high voltages, are to be switched without danger of shock.

Figure 1:
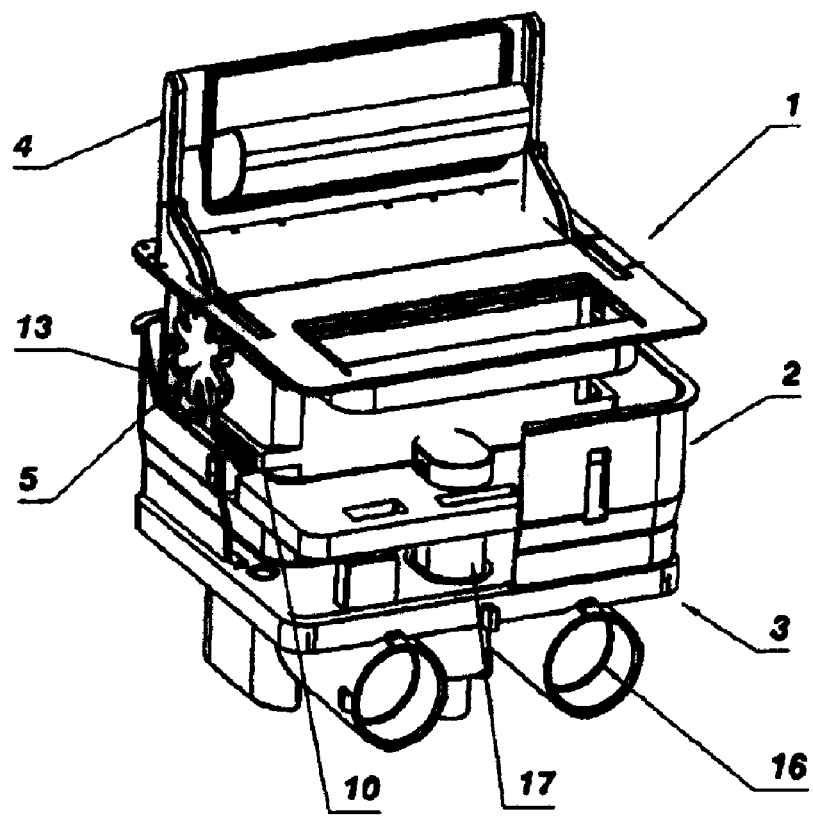
FIG. 1 illustrates a high-power breaker switch having a connector housing, a surrounding housing, a socket housing, a lever mechanism, and a cover in accordance with an embodiment of the present invention with the housings being partly connected.
Figure 2:
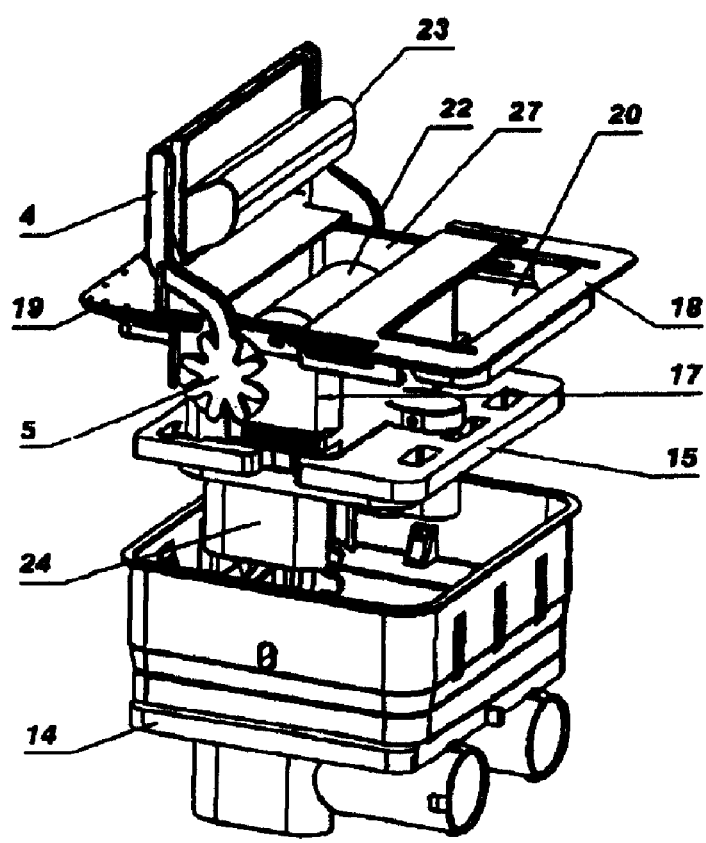
FIG. 2 illustrates an exploded view of the breaker switch.
Figure 3:
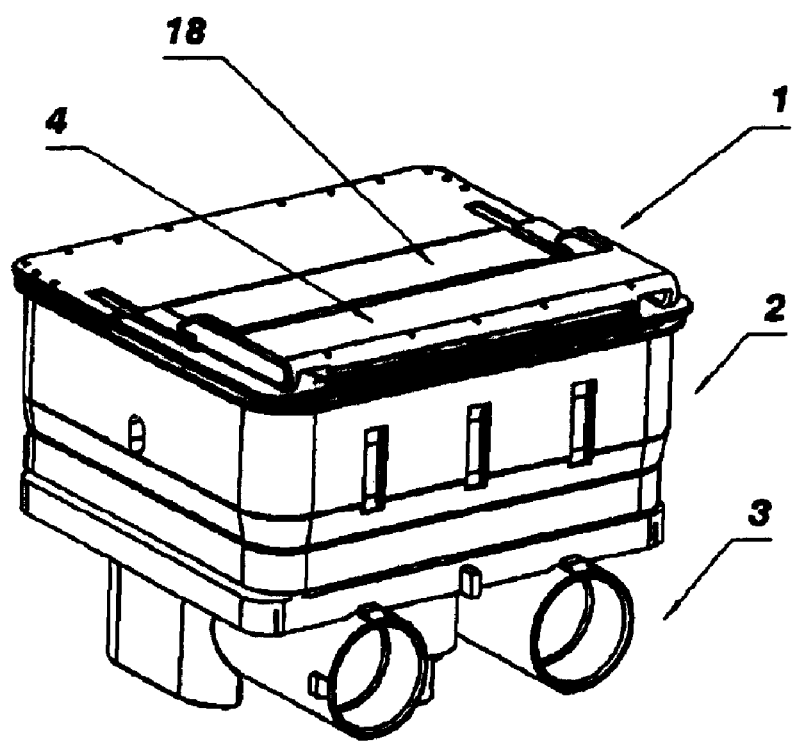
FIG. 3 illustrates the breaker switch with the housings being connected.

Referring now to FIGS. 1, 2, and 3, a high-power breaker switch in accordance with an embodiment of the present invention is shown. The breaker switch includes three housings: a connector housing 1, a surrounding housing 2, and a socket housing 3. FIG. 1 illustrates the breaker switch with housings 1, 2, and 3 partly connected. FIG. 2 illustrates an exploded view of the breaker switch. FIG. 3 illustrates the breaker switch with housings 1, 2, and 3 connected.

Connector housing 1 contains a pair of electrical plug-in contact elements. The plug-in contact elements are in the form of flat tab connectors designed for high currents. Connector housing 1 includes a base plate 15 having a contact body 24 that surrounds the plug-in contact elements. Contact body 24 is formed as a single piece on a lower surface of base plate 15. Base plate 15 has on its top surface a fuse chamber 27 for an electrical fuse 22. Fuse 22 inserted into fuse chamber 27 creates an electrically connection between the plug-in contact elements.

Socket housing 3 includes a base plate 14 having a pair of socket contacts. The plug-in contacts of connector housing 1 respectively insert into the socket contacts when connector housing 1 is joined to socket housing 3. Socket housing 3 further has a pair of power terminals 16. Electrical leads can be connected through power terminals 16 with the breaker switch. For this purpose, power terminals 16 can have plug-and-socket connectors, screw connectors, or crimp connectors arranged within socket housing 3.

The socket contacts respectively make an electrically conductive connection with power terminals 16. As such, joining connector housing 1 to socket housing 3 enables power terminals 16 to be electrically connected with one another via the electrical connections between the plug-in contact elements and the socket contacts and the electrical connections between the plug-in contact elements and fuse 22. Again, the electrical connections between the plug-in contact elements and the socket contacts occur when connector housing 1 and socket housing 3 are joined together. The electrical connections between the plug-in contact elements and fuse 22 occur when fuse 22 is inserted into fuse chamber 27.

Accordingly, when connector housing 1 and socket housing 3 are joined together, an electrical connection path is established through, in order, a first one of power terminals 16, a first one of socket contacts, a first one of plug-in contact elements, fuse 22, a second one of plug-in contact elements, a second one of contact sockets, and a second one of power terminals 16. In turn, power terminals 16 are connected to an electrical supply thereby forming a power circuit including the electrical connection path. Joining connector housing 1 with socket housing 3 electrically connects power terminals 16 with fuse 22 through the plug-and-socket connection that is made. The electrical connection can be broken in a corresponding manner by separating connector housing 1 and socket housing 3 from one another.

To ensure good protection against accidental contact, socket housing 3 is connected with surrounding housing 2. Surrounding housing 2 can be attached or formed on socket housing 3. Surrounding housing 2 is made in the form of a metal or metallized housing part that forms a surface shell of the breaker switch and shields against electromagnetic interference which may be emitted from the breaker switch.

Figure 4:
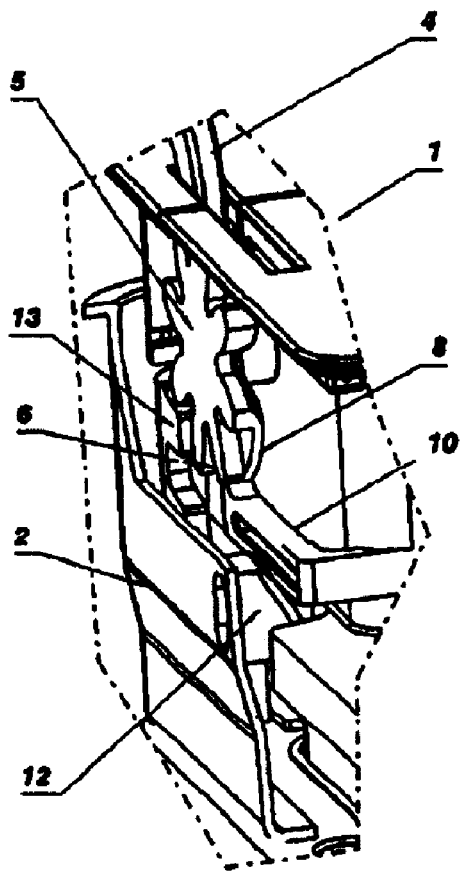
FIG. 4 illustrates the lever mechanism of the breaker switch.
Figure 5:
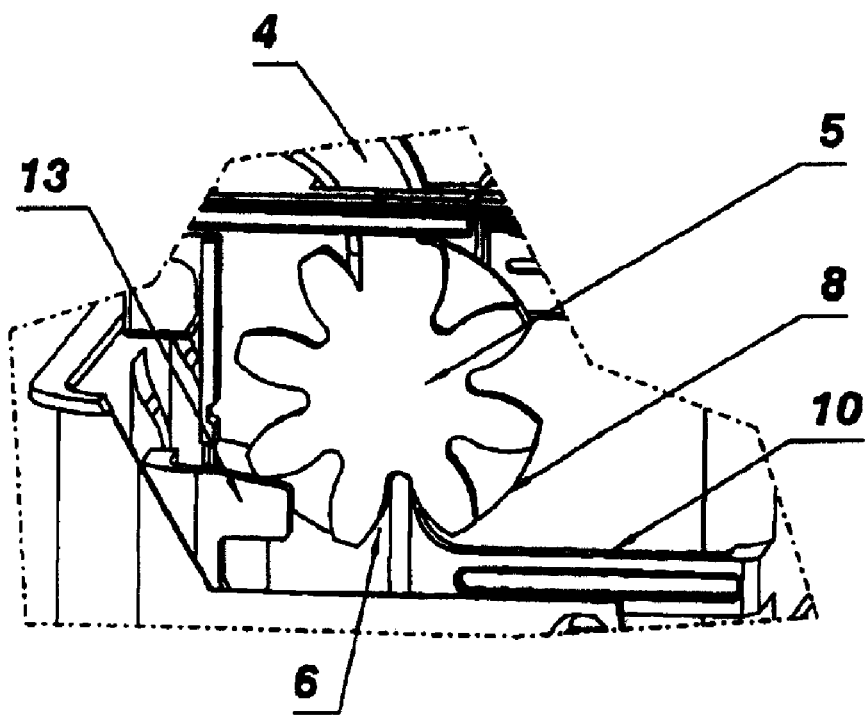
FIG. 5 illustrates a first view of a gear of the lever mechanism and a blocking lever of the connector housing.
Figure 6:
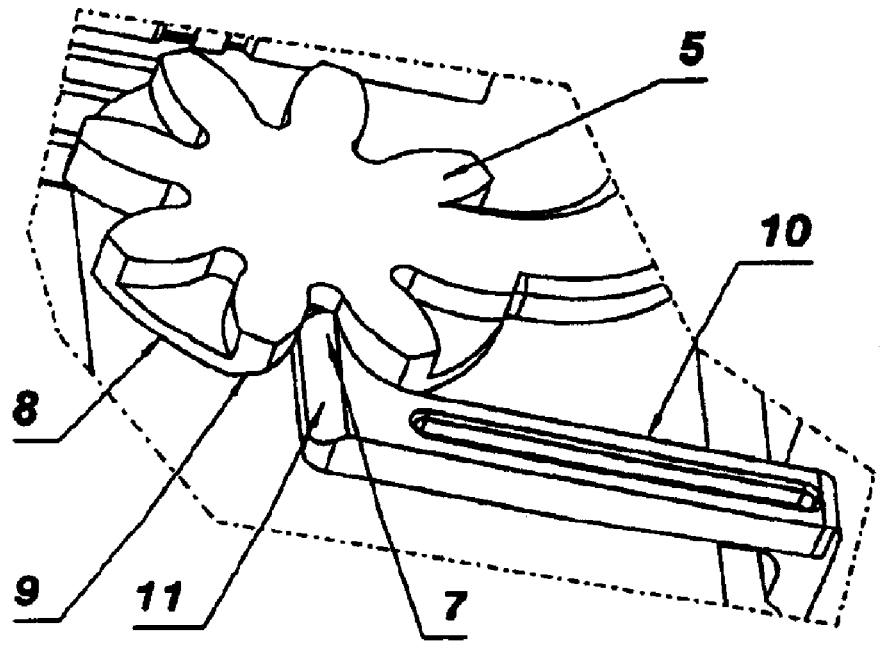
FIG. 6 illustrates a second view of the gear and the blocking lever.

Referring now to FIGS. 4, 5, and 6, with continual reference to FIGS. 1, 2, and 3, the lever mechanism of the breaker switch will be described. The lever mechanism is used to apply the relatively high insertion forces occurring in high-load plug-and-socket connections in order to join connector housing 1 with socket housing 3. The lever mechanism includes a bow-shaped operating lever 4. Operating lever 4 is pivotably mounted at two places on connector housing 1. In each mounting point, operating lever 4 forms a gear 5. Operating lever 4 with gears 5 are a single piece.

Joining connector housing 1 to socket housing 3 causes each gear 5 to mesh with a corresponding gear rack 13 formed on socket housing 3. Each gear rack 13 extends in the direction of connector housing 1. Pulling down operating lever 4 makes each gear 5 rotate with operating lever 4 about a quarter turn clockwise, causing translational motion of operating lever 4 together with connector housing 1 in the direction of socket housing 3. If operating lever 4 has been pulled down all the way (shown in FIG. 3), then connector housing 1 reaches its final position with respect to socket housing 3. In this position, the plug-in contact elements of connector housing 1 completely engage in the socket contacts of socket housing 3 and thus form electrically conductive connections.

FIGS. 4, 5, and 6 are intended to illustrate the mode of operation of the lever mechanism more clearly. FIG. 4 illustrates a section of operating lever 4 which, along with gear 5 and connector housing 1, is in a starting position. Gear 5 is in front of the top edge of gear rack 13 with which gear 5 is intended to mesh by a movement of operating lever 4.

Connector housing 1 includes a one-arm blocking lever 10. In the starting position of operating lever 4, the free end section of blocking lever 10 meshes into a first tooth space 6 of gear 5. This blocks the mobility of operating lever 4 which is connected with gear 5 as a single piece.

A control edge 12 is formed on the inside of surrounding housing 2. Control edge 12 widens downward. If connector housing 1 is now pushed in the direction of surrounding housing 2, then control edge 12 presses against the long side of blocking lever 10 thereby pushing the free end section of blocking lever 10, which is blocking gear 5, out of the plane of rotation of gear 5. This unblocks gear 5 and thus simultaneously unblocks operating lever 4. Operating lever 4 can now be pulled down, causing gear 5 to mesh with gear rack 13 of socket housing 3, pushing connector housing 1 in the direction of socket housing 3 until the plug-in contact elements are connected with the socket contacts.

The initial locking of gear 5 by blocking lever 10 prevents connector housing 1 and socket housing 3 from being joined when surrounding housing 2 is not correctly mounted. This prevents the breaker switch from making the electrical connection when there is insufficient protection against accidental contact or ineffective shielding of electromagnetic fields as a result of surrounding housing 2 being absent or wrongly positioned.

In FIG. 5, operating lever 4 is in the starting position. This is recognizable by the direction in which operating lever 4 goes away from gear 5. In the starting position, again, operating lever 4 is blocked by the meshing of blocking lever 10 into first tooth space 6 of gear 5.

In FIG. 6, operating lever 4 along with gear 5 and connector housing 1 are in a final position as a result of operating lever 4 being pulled down. In the final position, the direction in which operating lever 4 goes away from gear 5 is rotated by about 90° clockwise compared with the starting position (shown in FIG. 5). Here the free end section of blocking lever 10 engages a second tooth space 7 of gear 5. This is possible as in the final position of connector housing 1 blocking lever 10 has already moved over control edge 12 of surrounding housing 2 (see FIG. 4) and has accordingly sprung back into its original position.

To keep blocking lever 10 from engaging in a tooth space in an intermediate position, gear 5 has a flat bridge plate 8 on its back that makes tooth spaces 6, 7 accessible to blocking lever 10 only from one side of gear 5. Bridge plate 8 is only interrupted for tooth spaces 6, 7. Tooth spaces 6, 7 respectively correspond to the starting position and the final position of operating lever 4. Bridge plate 8 additionally increases the axial and radial resistance torque and thus gives gear 5 increased torsional stiffness. Because control edge 12 presses blocking lever 10 behind bridge plate 8 of gear 5 (visible in FIG. 4) blocking lever 10 is prevented from springing back into its starting position until reaching second tooth space 7 of gear 5 which corresponds to the final position of operating lever 4.

The blocking of operating lever 4 in its final position is advantageous as this prevents accidental or spontaneous opening of the breaker switch due to mechanical effects such as, for example, vibrations of the vehicle body.

Figure 7:
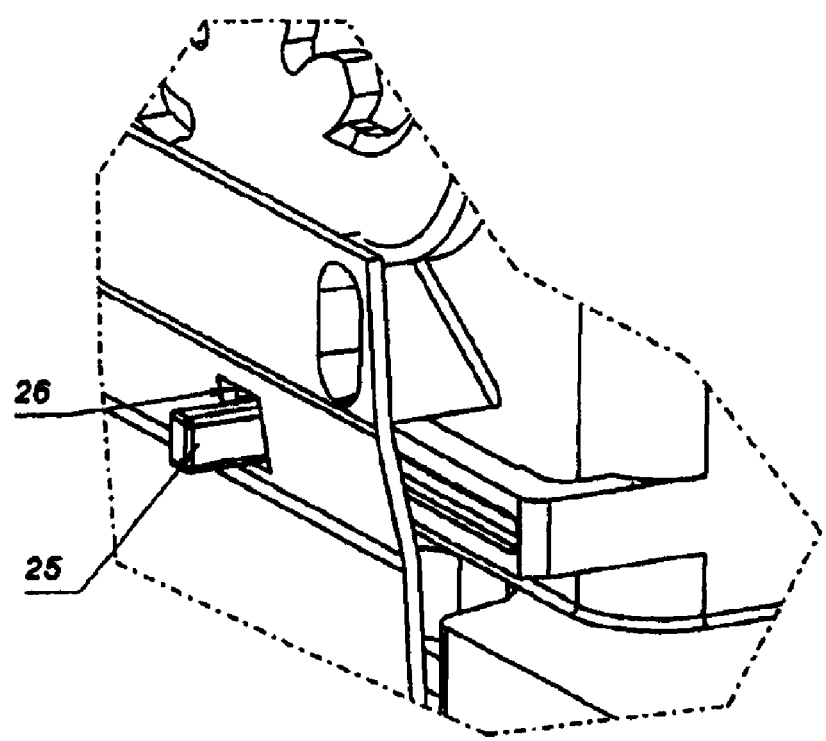
FIG. 7 illustrates a release pin of the breaker switch.

With reference to FIG. 7, the breaker switch may be provided with an unlocking pin 25 for unlocking the blocked operating lever 4. Unlocking pin 25 projects through an unlocking opening 26 in the wall of surrounding housing 2. Unlocking pin 25 is either mounted on surrounding housing 2 or formed on blocking lever 10.

Figure 8:
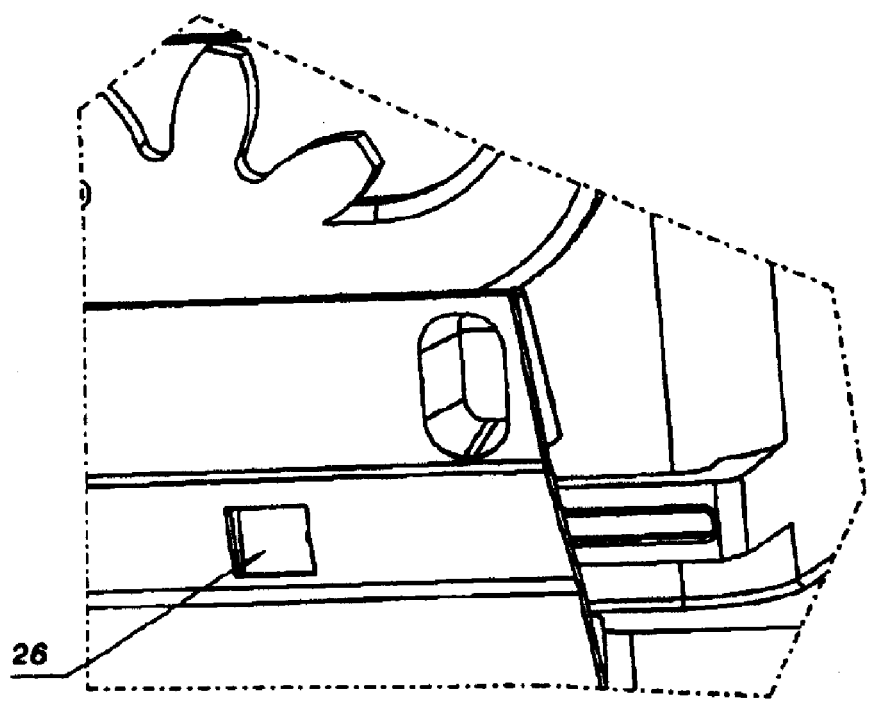
FIG. 8 illustrates a release opening of the breaker switch.

The assembly engineering is even simpler if there is no unlocking pin but only an unlocking opening 26 in surrounding housing 2. With reference to FIG. 8, this configuration is shown. By inserting a pin-like object such as a narrow screwdriver into unlocking opening 26 it is possible to move blocking lever 10 to release gear 5 and thus to release operating lever 4. Chamfers 9, 11 respectively on the back of gear 5 and the free end section of blocking lever 10 (shown in FIG. 6) assist in blocking lever 10 sliding out of tooth space 6.

Connector housing 1 and socket housing 3 also include plug-in contact elements designed for low electrical power. These plug-in contact elements can be connected together and are collectively referred to below as a signal connector 17. The housing contour of signal connector 17 is shown in FIGS. 1 and 2.

When connector housing 1 and socket housing 3 are joined together, signal connector 17 closes an electrical signal circuit (i.e., "signal circuit") that signals the connection state of the breaker switch. This signal can be provided to trigger an electronic or electro-mechanical relay that is inserted into the power circuit of the breaker switch, so that the breaker switch can connect and disconnect the power contacts free of current and voltage. This requires that the closing of the signal circuit lags behind that of the power circuit and that the opening of the signal circuit is ahead of that of the power circuit. Thus, when the breaker switch is disassembled (i.e., when connector housing 1 is separated from socket housing 3), the signal circuit is first interrupted by rotary movement of operating lever 4. This movement and subsequent translational motion of housings 1, 3 away from one another causes the power circuit to subsequently open. The sequence when housings 1, 3 are connected takes place in the reverse order.

The power circuit has electrical fuse 22 inserted into it as an overload protection. As FIG. 2 illustrates, fuse 22 is arranged in fuse chamber 27 of connector housing 1. Fuse chamber 27 can be closed by the cover. The cover can be a single part or multiple parts. In the embodiment of the breaker switch shown in the FIGS., the cover includes two cover parts 18, 19 (see FIG. 2). Cover parts 18, 19 are movable relative to an access opening of fuse chamber 27. In order to accomplish such movement, cover parts 18, 19 are connected in a captive manner to connector housing 1 and guided like drawers on an edge section of connector housing 1.

First cover part 18 has a cutout 20 whose shape matches that of a shaped part 23 on the bow of operating lever 4. Shaped part 23 of operating lever 4 can be lowered into cutout 20. However, this is only possible when first cover part 18 is in a position in which first cover part 18 closes fuse chamber 27 to at least a large extent. Otherwise, shaped part 23 of operating lever 4 strikes the surface of first cover part 18.

In order for connector housing 1 to be able to be joined to socket housing 3, second cover part 19 has to also be brought into the closed position. Otherwise, second cover part 19 strikes an edge of surrounding housing 2 during the insertion motion of connector housing 1.

This procedure thereby enables operating lever 4 to be fully pulled down, and thus a connection of the power and signal circuits is possible only when fuse chamber 27 is enclosed by cover parts 18, 19.

If operating lever 4 has been pulled down all the way and consequently power terminals 16 are electrically connected with one another, then shaped part 23 of operating lever 4 is lowered into cutout 20 of second cover part 18. This is shown in FIG. 3. The insertion of shaped part 23 of operating lever 4 fixes the position of first cover part 18 such that first cover part 18 cannot be moved as long as operating lever 4 is pulled down. This makes it impossible to access the inside of fuse chamber 27 when the breaker switch is carrying current or voltage.

A summary of the mode of operation of the high-power breaker switch follows. The breaker switch is assembled in two steps. The moving part of the breaker switch undergoes translational motion in the plugging direction. This closes the power circuit. The process is limited after the locked operating lever 4 touches gear rack 13 of the fixed part (i.e., socket housing 3) of the breaker switch. At the end of the first assembly step, operating lever 4 is released to rotate over control edge 12 in surrounding housing 2. The following rotation additionally closes the signal circuit.

Operating lever 4 mounted on the breaker switch is, in the state in which it is delivered, locked by blocking lever 10. The design layout of blocking lever 10 allows its displacement (see FIG. 1). It is unlocked by control edge 12 inside surrounding housing 2, which deflects blocking lever 3 during the assembly process, thereby releasing operating lever 4. Bridge plate 8 formed between gear tooths 6, 7 prevents blocking lever 10 from swinging back into its starting position during the following rotation.

The locking of operating lever 4 and because its release by control edge 12 is required ensures that surrounding housing 2 is assembled properly (i.e., results in the presence of surrounding housing 2 being detected).

The final assembly of the breaker switch is accomplished by the subsequent rotation of operating lever 4. This causes gear 5 on operating lever 4 to mesh with gear rack 13 of socket housing 3. After the end of the rotation process, blocking lever 10 swings back into its starting position. Thus, blocking lever 10 is only under mechanical stress during the assembly process.

LIST OF REFERENCE NUMBERS

1 Connector housing
2 Surrounding housing
3 Socket housing
4 Operating lever
5 Gear
6, 7 Tooth spaces
8 Bridge plate
9 Chamfer (on gear)
10 Blocking lever
11 Chamfer (on blocking lever)
12 Control edge
13 Gear rack
14 Base plate (on socket housing)
15 Base plate (on connector housing)
16 Power terminals
17 Signal connector
18 First cover part
19 Second cover part
20 Cutout (in cover)
22 Fuse 23 Shaped part (on operating lever)
24 Contact body
25 Unlocking pin
26 Unlocking aperture
27 Fuse chamber While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A high-power breaker switch comprising:
a connector housing having plug-in contact elements, the connector housing further having a blocking lever;
a socket housing having socket contacts, the socket housing further having a gear wheel rack;
an operating lever having a gear wheel pivotably mounted to the connector housing and engaged to the gear wheel rack of the socket housing to thereby pivotably mount the connector housing to the socket housing such that the connector housing is movable with the operating lever relative to the socket housing between a starting position and a final position, wherein the gear wheel rotates within the gear wheel rack along a plane of rotation as the connector housing along with the operating lever move between the starting and final positions, wherein in the starting position the connector housing is disengaged from the socket housing such that the plug-in contact elements are disengaged from the socket contacts, wherein in the final position the connector housing is engaged with the socket housing such that the plug-in contact elements are engaged and electrically connected with the socket contacts;
wherein in the starting position the blocking lever engages a first gap of the gear wheel of the operating lever to maintain the connector housing along with the operating lever in the starting position;
wherein in the final position the blocking lever engages a second gap of the gear wheel of the operating lever to maintain the connector housing along with the operating lever in the final position;
a surrounding housing connected to the socket housing between the connector housing and the socket housing, the surrounding housing having a control edge that releases the blocking lever from the gear wheel to enable the connector housing along with the operating lever to be movable between the starting and final positions.

2. The switch of claim 1 wherein:
the blocking lever engages the first gap of the gear wheel to prevent the connector housing along with the operating lever from moving from the starting position when the surrounding housing is improperly connected to the socket housing such that the control edge of the surrounding housing is unable to release the blocking lever from the gear wheel.

3. The switch of claim 1 wherein:
the blocking lever engages the second gap of the gear wheel to prevent the connector housing along with the operating lever from moving from the final position when the surrounding housing is improperly connected to the socket housing such that the control edge of the surrounding housing is unable to release the blocking lever from the gear wheel.

4. The switch of claim 1 wherein:
the control edge of the surrounding housing laterally presses on the blocking lever to force the blocking lever out of the plane of rotation of the gear wheel in order to release the blocking lever from the gear wheel when the connector housing along with the operating lever is being moved from the starting position to the final position.

5. The switch of claim 4 wherein:
the control edge of the surrounding housing disengages from the gear wheel to enable the blocking lever back into the plane of rotation of the gear wheel in order for the blocking lever to engage the second gap of the gear wheel when the connecting housing along with the operating lever is in the final position.

6. The switch of claim 1 wherein:
the control edge of the surrounding housing laterally presses on the blocking lever to force the blocking lever out of the plane of rotation of the gear wheel in order to release the blocking lever from the gear wheel when the connector housing along with the operating lever is being moved from the final position to the starting position.

7. The switch of claim 6 wherein:
the control edge of the surrounding housing disengages from the gear wheel to enable the blocking lever back into the plane of rotation of the gear wheel in order for the blocking lever to engage the first gap of the gear wheel when the connecting housing along with the operating lever is in the starting position.

8. The switch of claim 1 wherein:
the blocking lever and the gear respectively have chamfers to assist in enabling the blocking lever to be released from the gear wheel.

9. The switch of claim 1 further comprising:
an unlocking pin projecting through an aperture of the surrounding housing, wherein the unlocking pin is actuable to laterally press on the blocking lever to force the blocking lever out of the plane of rotation of the gear wheel in order to release the blocking lever from the gear wheel when the connector housing along with the operating lever is being moved between the starting and final positions.

10. The switch of claim 1 wherein:
the surrounding housing is metallic.

* * * * *